Dec. 4, 1934.　　　　A. ALLTREE　　　　1,982,976
CHANGE SPEED GEARING
Filed Oct. 16, 1933　　　5 Sheets-Sheet 1

Dec. 4, 1934.  A. ALLTREE  1,982,976
CHANGE SPEED GEARING
Filed Oct. 16, 1933   5 Sheets-Sheet 2

A. Alltree
INVENTOR
By Merks & Clerk
Attys.

Dec. 4, 1934.  A. ALLTREE  1,982,976
CHANGE SPEED GEARING
Filed Oct. 16, 1933  5 Sheets-Sheet 3

Dec. 4, 1934.　　　　A. ALLTREE　　　　1,982,976

CHANGE SPEED GEARING

Filed Oct. 16, 1933　　　5 Sheets-Sheet 4

A. Alltree
INVENTOR

By Marks & Clerk
Attys.

Patented Dec. 4, 1934

1,982,976

UNITED STATES PATENT OFFICE 1,982,976

CHANGE SPEED GEARING

Arthur Alltree, Preesall, near Fleetwood, England

Application October 16, 1933, Serial No. 693,871
In Great Britain October 21, 1932

14 Claims. (Cl. 74—334)

My invention relates to change-speed gears of the constant mesh type or the sliding gear type, and to gears employing any combination of these types, my invention being specially applicable to any form or arrangement of this class of gearing as used on motor cars, motor cycles, or other motor driven vehicles, and my invention may be employed with change-speed gears providing any number of speeds forward or reverse, the object of my invention being to provide a simplified control for such gears.

The invention comprises the improved preselective control means for gears of the aforesaid type as hereinafter described and claimed.

Referring to the accompanying sheets of explanatory drawings:—

Figures 1-6 illustrate a two speed gear with my improved control means applied thereto. Figure 1 is a plan view of the gear shift fork and connected levers, Figure 2 a sectional side elevation of the complete mechanism, Figure 3 a view similar to Figure 2 but with the parts in a different position, Figure 4 a plan view of the control means with a gear in engagement, Figure 5 a view similar to Figure 1, but with the parts in the positions they occupy when a gear is in engagement and with the gear locking means in position and Figure 6 a detail view of the gear locking and neutralizing cam.

Figures 7 and 8 illustrate a four speed forward and reverse gear with control means in accordance with this invention. Figure 7 shows the gear shift forks and Figure 8 is a plan view of the control and operating mechanism. Figure 9 is a detail view, showing the flat faces on the selector shaft.

Referring in the first place to Figures 1-5, 2 indicates the gear shift fork which is slidably mounted on a rod 1 suitably supported and mounted in the gear box. The fork 2 is moved in one direction along the rod 1 to effect one gear change and in the opposite direction along such rod to effect a second gear change. The movement of 2 is effected by the shift lever 3 which is pivoted at 4 to the gear box casing and at its free end 3$^a$ enters a groove 2$^a$ in the fork 2. The lever 3 has two wings 3$^b$ and 3$^c$ thereon, the functions of which will be described later.

Figure 4:
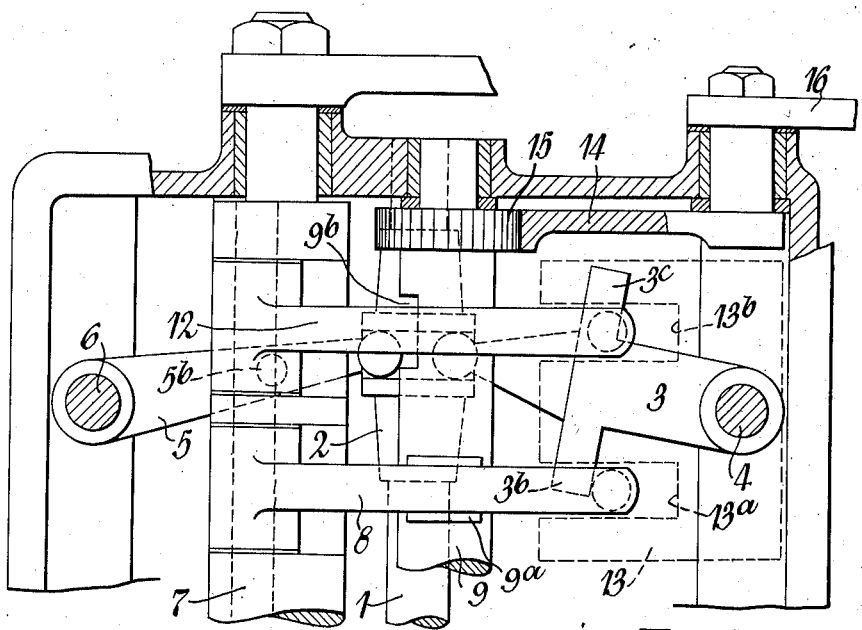

A lever 5, which I term a gear neutralizing shift lever, is pivoted at one end 6 to the gear box casing and at its other end 5$^a$ enters the groove 2$^a$ in the gear shift fork 2. Upon the lever 5 is a peg 5$^b$ which enters a cam groove having inclined walls 7$^a$, 7$^b$ (see Figure 5) in a neutralizing cam-shaft 7 which is mounted in suitable bearings in the gear box at its opposite ends. One end of the shaft is shown in Figure 4. Pivoted on a pin 7$^c$ mounted in the camshaft 7 are two link bars or arms 8 and 12, each of which has a peg, roller or the like (as 8$^a$ Figure 2) depending therefrom which when so allowed can engage the wings 3$^b$ and 3$^c$ of the lever 3. A spring as 10 on cover plate 11$^a$ bears upon each link bar 8, 12 to tend to press the peg or roller thereon into engagement with the aforesaid wings but the downward movement of the link bars is controlled by a selector shaft 9 parallel with the rod 1, such shaft 9 having slots or flats as 9$^a$ thereon. When one of the latter is brought beneath a link bar, the latter can move into engagement with a wing of the lever 3 as hereinafter more fully described.

Figure 5:
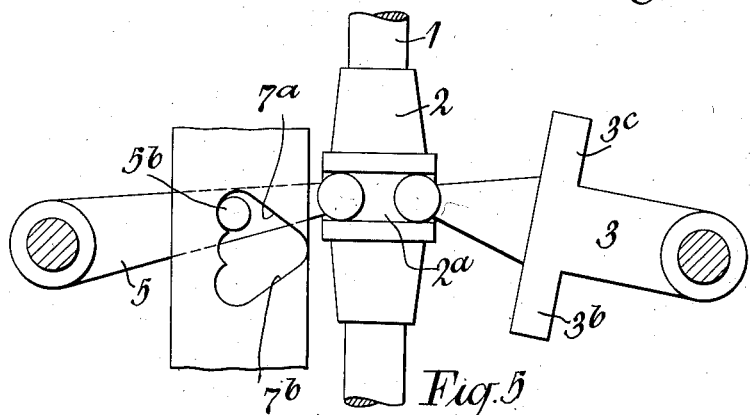

It will be seen by reference to Figure 5, that if the cam shaft 7 be turned to the left, the cam face 7$^a$ will engage the peg 5$^b$ and move it to a mid-position in the apex between the cam faces 7$^a$ and 7$^b$. This will cause the lever 5 to move the shift fork 2 to a neutral position. It will be seen therefore that when a gear has been engaged, turning of the camshaft 7 always results in neutralizing the gears.

Figure 1:
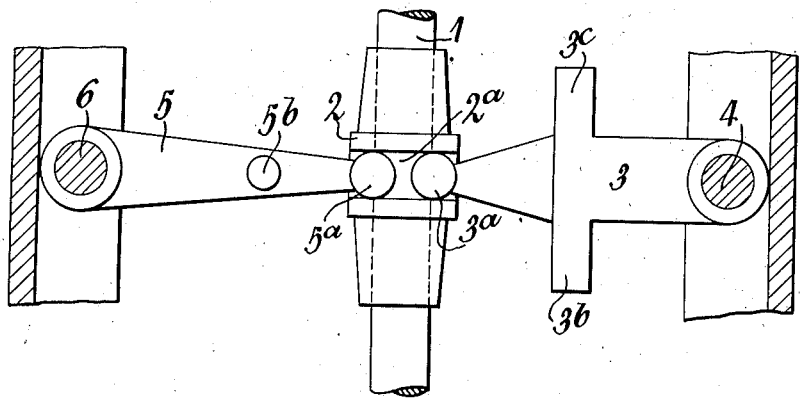
Figure 2:
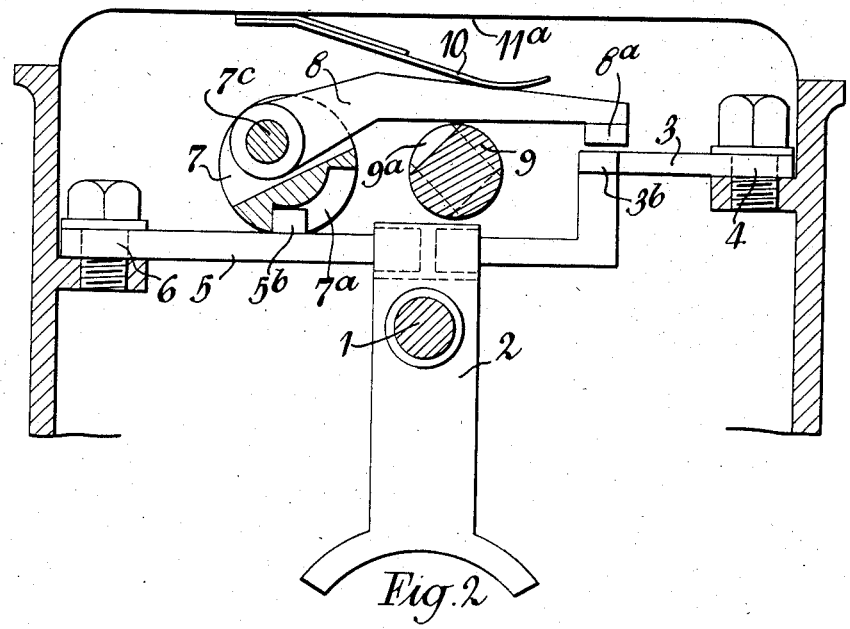
Figure 3:
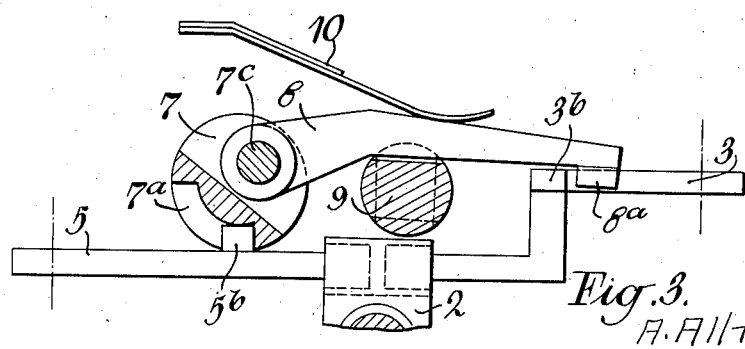
Figure 6:

With the parts in the positions shown in Figures 1 and 2, if the flat 9$^a$ be brought beneath the link bar 8, such bar is allowed to rest with its peg or roller 8 upon the wing 3$^b$. If now the cam shaft 7 be turned in a clockwise direction, a cam face 7$^a$ or 7$^b$ will move the peg 5$^b$ to a neutral position and the link arm peg or roller 8$^a$ will be moved beyond the wing 3$^b$ so that it can fall behind it as shown in Figure 3. A movement of the cam shaft 7 in an anti-clockwise direction will now cause the link arm 8 to turn the lever 3 about its pivot as shown in Figure 4 and so effect an axial movement of the shift fork 2 and of the neutralizing shift lever 5. The peg 5$^b$ on the latter will now pass into the groove 7$^d$ (see Figure 6) in the cam groove of the cam shaft 7. If the other gear is to be engaged, the selector shaft 9 is turned to bring the flat 9$^b$ beneath the link bar 12. The gear is however still held in engagement by the lever 5 which is locked by the peg 5$^b$ and cam groove. The camshaft 7 is now turned in a clockwise direction which puts the peg 5$^b$ and so the lever 5 and shift fork 2 in a neutral position. It also allows the peg or roller on the link bar 12 to fall behind the wing 3ᶜ of the lever 3. When the cam shaft 7 is now turned in an anti-clockwise direction, the link bar 12 pulls the wing 3ᶜ and turns the lever 3 about its fulcrum so moving the shift fork 2 in the opposite direction to that shown in Figure 4.

The peg 5ᵇ is now in the recess 7ᵉ. 7ᶠ indicates the neutral position of the peg 5ᵇ when the gear is locked in neutral.

I may provide guides 13 with slots 13ᵃ and 13ᵇ therein to strengthen the link bars against lateral thrusts.

The selector shaft 9 may be turned by a toothed quadrant 14 engaging a pinion 15 on the shaft 9, the quadrant being turned by a lever 16 which may be disposed or be connected to a further lever for convenient manipulation. The said lever serves for the selection of the gear to be engaged and the cam shaft 7 serves to neutralize all gears and then to engage the selected gear.

Figure 9:
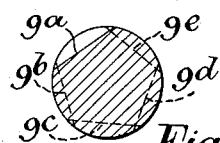
Figure 7:
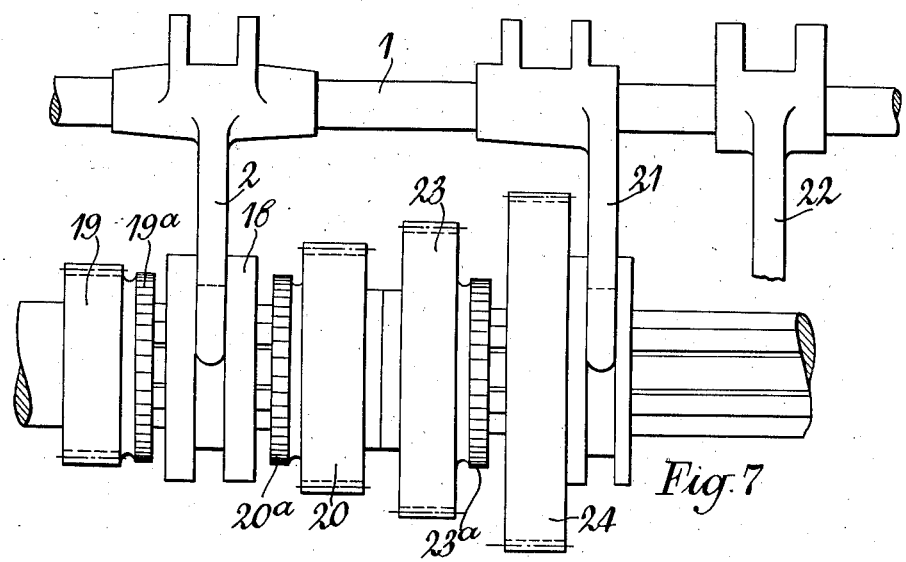
Figure 8:
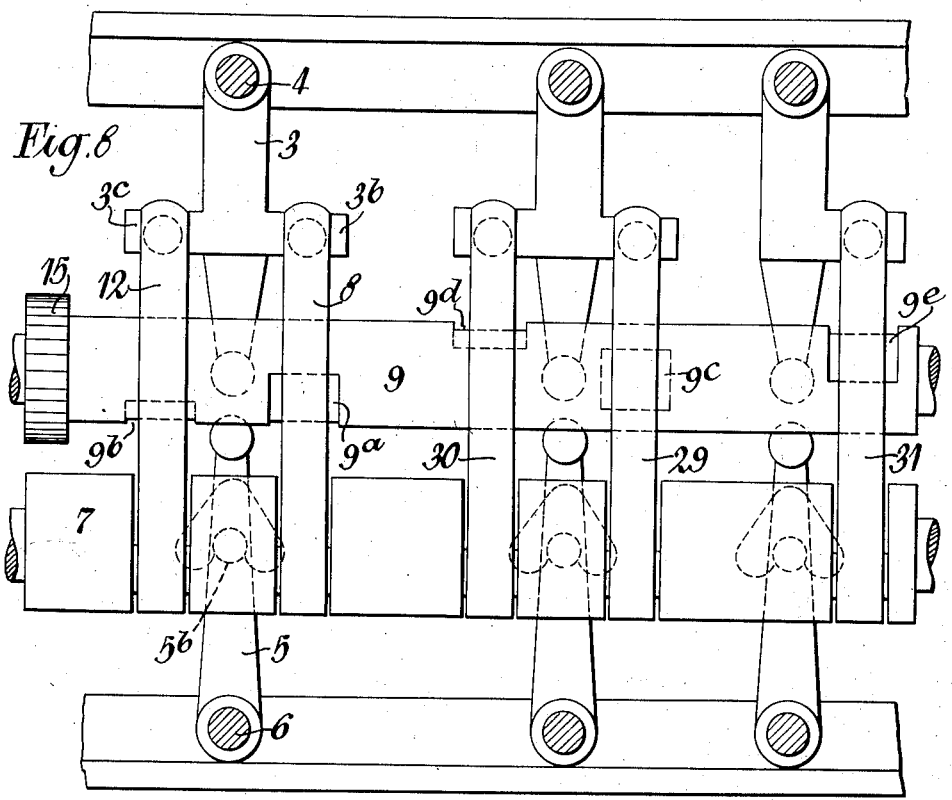

Figures 7, 8 and 9 illustrate my invention arranged in combination with a change-speed gear providing four forward speeds and one reverse speed but it will be understood that this arrangement of my invention may be used with other layouts of the gear members providing a similar number of speeds. The levers 3 and 5 of Figures 1–4 are duplicated for the four forward speeds and a lever as 3 but with one wing only is combined with a lever as 5 of Figure 3 to give the reverse gear drive. There are pegs and cam slots for each lever as 3 of Figures 1–4. The selector shaft has a flat (9ᵃ, 9ᵇ, 9ᶜ, 9ᵈ, 9ᵉ) for each link bar (12, 8, 30, 29, 31). There are three shift forks 2, 21 and 22 upon the rod 1. The shift fork 2 may shift a dog or equivalent clutch 18 into engagement with teeth 19ᵃ on the primary shaft pinion 19 to give top gear and into engagement with dogs or teeth 20ᵃ on a loose gear wheel 20 to obtain third speed. The fork 21 slides the large gear wheel 24 to engage dogs or teeth 23ᵃ formed on the loose gear wheel 23 to give the second speed or to engage a pinion on the lay shaft for the first speed. The shift fork 22 engages the reversing pinions. It is thought that the operation of the four speed and reverse gear box will be clear from a consideration of the two speed gear shown in Figures 1–4. In each case, the selector shaft 9 determines the gear to be brought into service, and the cam shaft 7 first neutralizes the gears and then brings the selected gear into use.

If desired, the selector shaft 9 may be arranged above instead of below the link arms, the latter being then pressed upwards to engage the wings of the levers as 3 which move the gear shift forks.

The portions of the wings upon the levers as 3 may be adjustable or may be varied to give the said levers greater or less angular movement for any predetermined movement of the link bars.

Figure 10:
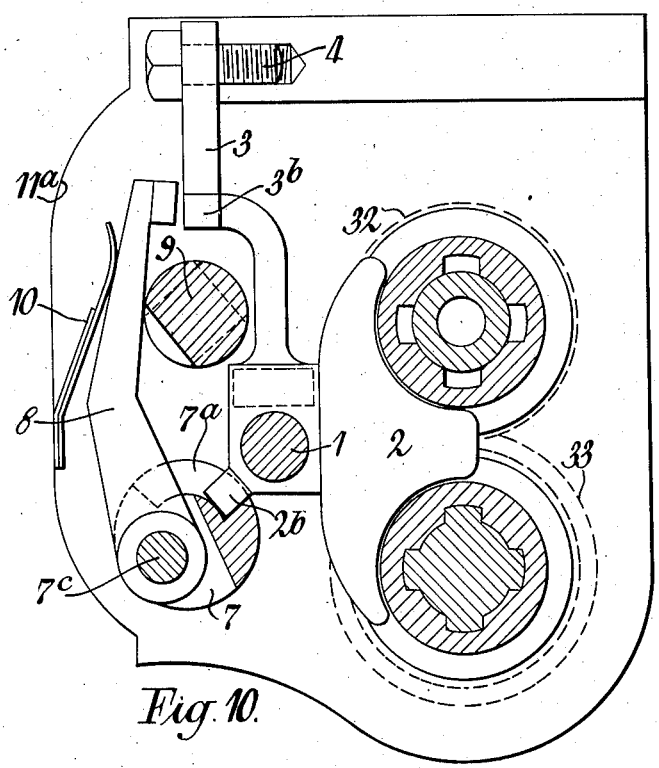
Figures 10 and 11 show a motor-cycle or compact form of gear with control means in accordance with this invention.
Figure 11:
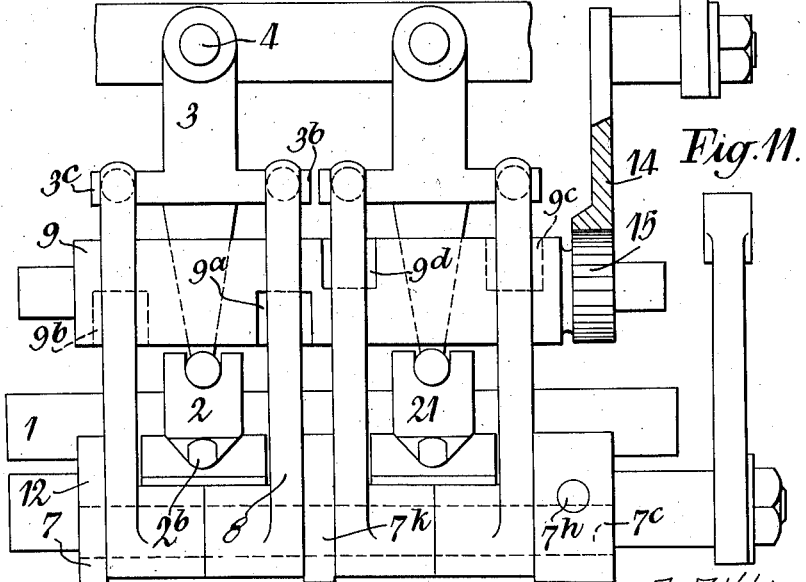

Figures 10 and 11 illustrate a modified arrangement of my invention for use with small gear-boxes such as are commonly used on motor cycles and like vehicles, my invention being applicable to any form of constant mesh or sliding gear used with this type of vehicle. As shown in Figures 10 and 11 the shift forks 2 and 21 are arranged to slide mating gear wheels 32 and 33 in pairs but the arrangement is substantially the same when the shift forks are employed to slide single gear wheels, dog clutches or other gear members, on either the mainshaft or layshaft or on both shafts. It will be noted that the pegs 2ᵇ which enter the cam slots in the cam shaft 7 are now formed directly upon the shift forks 2 and 21 instead of upon separate levers as in the previous constructions. The shift forks 2 and 21 are shown arranged to slide mating gear wheels such as 32 and 33 in pairs although other arrangements for gear change may be used. The pivot pin 7ᶜ for the link bars may be supported at its opposite ends and also by an intermediate part 7ᵏ. 7ʰ is a cotter pin for holding the pivot pin 7ᶜ in place. A four speed gear box is shown but any number of speeds may be controlled by my improved pre-selective mechanism.

Figure 12:
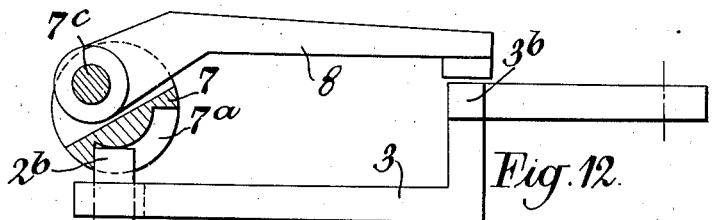
Figures 12 to 16 show various detailed modifications of my improved control means.

In the modification shown in Figure 12, the cam shaft 7 acts directly upon a peg 2ᵇ on the shift fork 2 and the lever 3 also engages said peg in order to operate the shift fork.

Figure 13:
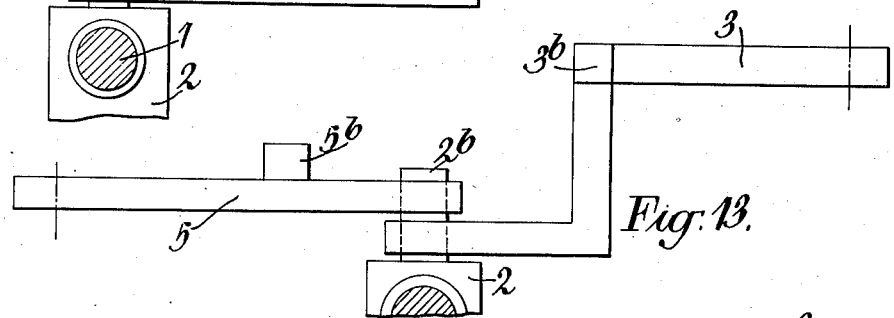

In Figure 13, both the lever 5 and the lever 3 engage a common pin or peg 2ᵇ on the shift fork. The ends of the levers 5 and 3 may be slotted for the purpose.

Figure 14:
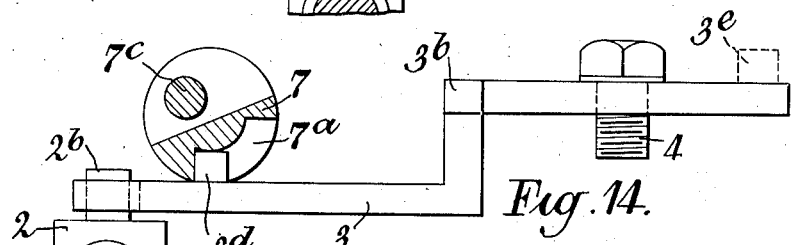

In the Figure 14 arrangement, the cam shaft 7 engages a peg 3ᵈ on the lever 3 instead of on a separate lever 5 as in Figure 1 or on the shift fork 2 as in Figure 12. The peg 3ᵈ may be in any suitable position upon the lever or even upon an extension thereof as indicated by dotted lines at 3ᵉ.

Figure 15:
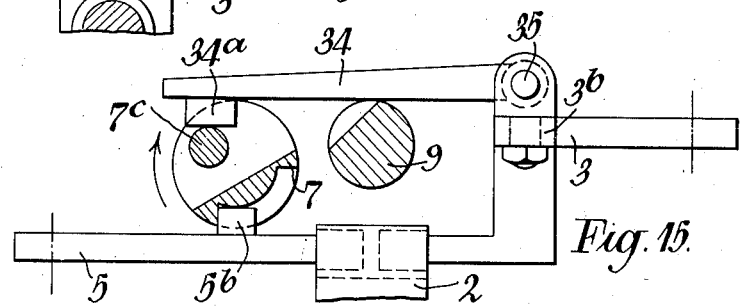

In Figure 15, the link arm 34 has an end 34ᵃ which can ride upon the pin 7ᶜ in the camshaft, the arm being swivel connected at 35 to the lever 3. When the camshaft 7 is turned in a clockwise direction, the part 34ᵃ finally drops behind the pin 7ᶜ and is drawn to the left by such pin when the camshaft is turned anti-clockwise. It then operates the gear shift lever 3 substantially in the manner previously described.

Figure 16:
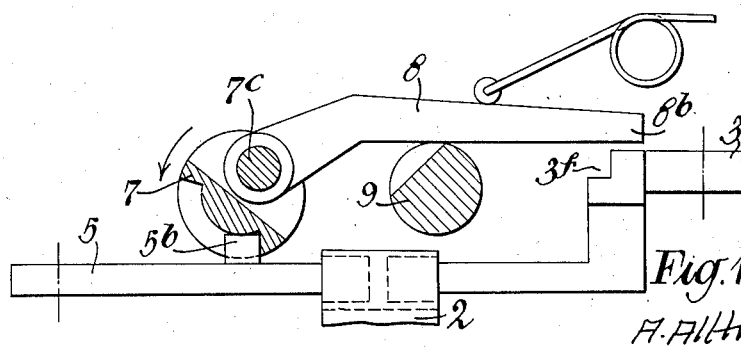

Figure 16 shows an alternative arrangement in which the cam shaft 7 is turned anti-clockwise to neutralize the shift fork 2 and clockwise to operate the lever 3. Upon anti-clockwise movement of 7, the end 8ᵇ of the link bar 8 falls on to the step 3ᶠ of the lever 3 and so operates the lever on the clockwise movement of the camshaft.

Instead of providing the cam grooves in the cam shaft, I may provide pegs upon the latter to engage cams in the parts previously described which have the pegs 5ᵇ, 2ᵇ or 3ᵈ thereon.

In any application of my invention the camshaft 7 may be connected to the control pedal of an engine friction clutch, or equivalent, so that the camshaft and clutch can be operated by the one control. Preferably the arrangement is such that the clutch is disengaged before the camshaft neutralizes the gears and is re-engaged before the selected gear engages. Alternatively a separate control pedal or lever, or other suitable means, may be employed to operate the camshaft.

My invention may be applied to synchro-mesh gears or to gears combined with a free wheel or other device to obtain smoother engagement of the gears.

What I claim is:

1. A control for change speed gearing comprising at least one gear shift fork slidable axially, a lever adapted to operate said fork to engage gears, a further lever adapted to operate said fork to release or neutralize the gears, a rotary element adapted in one direction of movement to operate link bars or arms to move said first named lever and in its other direction of movement to operate said further lever to neutralize the gears, and a selector element allowing a link bar or arm to move into operative position.

2. In change speed gearing as claimed in claim 1 the arrangement wherein the part which in one direction of movement neutralizes the gears and in the other direction operates a pre-selected gear, also provides a locking means to hold the gear which has been selected in engagement or to hold all gears in neutral.

3. In a control for change speed gearing as claimed in claim 1, the provision in the rotary element of a cam slot adapted to cooperate with a peg upon the further lever so as successively to lock the engaged gear, to move the further lever to neutralize the gears and to lock the gears in the neutral position.

4. A control for change speed gearing as claimed in claim 1, in which the lever which operates the shift fork to engage a gear, has wings upon its opposite sides to be engaged by the link bars or arms under the control of the gear selector.

5. A control for change speed gearing as claimed in claim 1, in which the link bars or arms are swivel connected to the lever which operates the shift fork and engage a pin on the rotary element under the control of the gear selector.

6. A control for change speed gearing as claimed in claim 1, in which the rotary member has the link bars or arms pivotally secured to a pin excentrically disposed in the rotary member each of said link bars or arms being furnished at the end remote from said rotary member with a projection adapted upon rotation of said rotary member in one direction to pass over and drop behind a projection formed upon one side of the lever which operates the shift fork and upon rotation of said rotary member in the opposite direction to exert a pull on said projection on said lever thereby turning said lever, the selector element specified permitting not more than one of said link bars or arms to drop as aforesaid.

7. A control for change speed gearing having at least three pairs of gear wheels giving different gear ratios, comprising a plurality of gear shift forks located between the said pairs of gear wheels and adapted by sliding movement to bring one of said pairs of gear wheels into operative engagement, a lever associated with each of said shift forks adapted to impart said sliding movement to said shift fork, a further lever associated with each of said shift forks adapted upon actuation after actuation of said first mentioned lever to restore said fork to its initial position, a single rotary element associated with all said further levers adapted by rotation in one direction to actuate all said further levers to restore all said shift forks to their initial positions and by rotation in the other direction to actuate a number of link bars equal to the number of said gear ratios and each adapted on actuation to actuate the lever associated with said shift fork to impart sliding movement to said shift fork, together with a rotary selector element movable step by step into a plurality of positions in each of which it holds all said link bars or all said link bars save one from operative engagement with said shift fork moving levers.

8. A control for change speed gearing according to claim 7 wherein said link bars are each pivotally secured to one of a plurality of pins excentrically disposed in the rotary element, the axes of said pins lying all in the same straight line and parallel to the axis of said rotary member.

9. A control for change speed gearing according to claim 7 wherein said rotary element is formed with a plurality of cam slots each co-operating with a projection upon one of said shift fork position-restoring levers to actuate said lever as aforesaid.

10. In a control for change speed gearing, a gear shift fork slidable axially to effect change of gear, a lever disposed at one side of said shift fork adapted to impart sliding movement to said fork, a second lever at the other side of said shift fork adapted to restore said fork to its initial position, a rotary member adapted by rotation in one direction to impart a sliding movement to said shift fork in one of two axial directions, and by rotation in the opposite direction to restore said fork to its initial position, together with a selector element adapted by its step by step rotation to determine in which axial direction if any said shift fork shall be moved.

11. A control for change speed gearing comprising at least one gear shift fork slidable axially, a lever adapted to operate said fork to engage gears, projections upon said lever at either side thereof, a rotary element adapted by its rotation in one direction to move said fork to a position in which it disengages the gears, and by its rotation in the other direction to impart movement to two link bars pivoted to said rotary member at a point remote from its axis of rotation, each of said link-bars being adapted to engage at its free end with one of the said projections and to move said lever and therewith said shift fork, together with a rotary selector element adapted by its position to prevent at least one of said link-bars operatively engaging with said projection.

12. A control for change speed gearing as claimed in claim 11, wherein said rotary element acts to move the said fork to disengage the gears by engaging a peg on said shift fork in a cam slot in said rotary element.

13. A control for change speed gearing as claimed in claim 11 wherein said rotary element acts to move the said fork to disengage the gears by engaging a peg on said lever in a cam slot in said rotary element.

14. A control for change speed gearing as claimed in claim 11, wherein said rotary element acts to move the said fork to disengage the gears by engaging a peg on an extension of said lever in a cam slot in said rotary element.

ARTHUR ALLTREE.